US006883711B2

United States Patent
Patton

(10) Patent No.: US 6,883,711 B2
(45) Date of Patent: Apr. 26, 2005

(54) MISSING LINK/PART DETECTOR EMPLOYING SCANNING ENGINE

(75) Inventor: Mark E. Patton, Dryden, NY (US)

(73) Assignee: BorgWarner Inc., Auburn Hills, MI (US)

( * ) Notice: Subject to any disclaimer, the term of this patent is extended or adjusted under 35 U.S.C. 154(b) by 95 days.

(21) Appl. No.: 09/932,791

(22) Filed: Aug. 17, 2001

(65) Prior Publication Data

US 2003/0034397 A1 Feb. 20, 2003

(51) Int. Cl.[7] .............................................. G06K 7/10
(52) U.S. Cl. ..................... 235/462.14; 235/462.01; 235/462.08; 235/462.06; 235/375
(58) Field of Search .................. 235/462.14, 462.01, 235/462.06, 462.08, 375, 376; 59/1, 8

(56) References Cited

U.S. PATENT DOCUMENTS

| | | | | | |
|---|---|---|---|---|---|
| 4,332,012 A | * | 5/1982 | Sekine et al. | ............... | 700/116 |
| 4,509,323 A | * | 4/1985 | Ledvina et al. | ............... | 59/8 |
| 4,567,437 A | | 1/1986 | Hubbard | ............... | 324/237 |
| 4,692,800 A | * | 9/1987 | Yoshida | ............... | 348/134 |
| 5,280,162 A | * | 1/1994 | Marwin | ............... | 235/462.31 |
| 5,414,513 A | * | 5/1995 | Leib | ............... | 356/450 |
| 5,434,792 A | * | 7/1995 | Saka et al. | ............... | 700/110 |
| 5,493,501 A | * | 2/1996 | Kondo | ............... | 700/95 |
| 5,602,885 A | * | 2/1997 | Ahmed et al. | ............... | 376/248 |
| 5,626,013 A | * | 5/1997 | Schneider | ............... | 59/78 |
| 6,036,087 A | * | 3/2000 | Hong et al. | ............... | 235/375 |
| 6,094,603 A | * | 7/2000 | Ishii | ............... | 700/97 |
| 6,345,208 B1 | * | 2/2002 | Yoshiyuki | ............... | 700/97 |
| 6,382,512 B1 | | 5/2002 | Chang | ............... | 235/462.25 |

OTHER PUBLICATIONS

Zebex Ame, Module Type Long CCD Bar Code Scanner, http://www.zebex.com/a60m.asp; 4 pages, no date.

* cited by examiner

Primary Examiner—Steven S. Paik
(74) Attorney, Agent, or Firm—Brown & Michaels, PC; Greg Dziegielewski

(57) ABSTRACT

A bar code reader missing link detection system for detection of missing, defective or misaligned chain links in assembled or in-process chains includes a light source for illuminating one or more chain links of a chain, a light sensitive diode array for detecting an image of a fixed scan line, produced by the light source, and a lens system for focusing incoming light produced by the light source onto the diode array, wherein the system is arranged such that the bar code reader reflects light from one or more of the chain links onto the diode array, and the diode array is continuously scanned, digitized, and the data obtained thereby interpreted to detect missing chain links.

32 Claims, 10 Drawing Sheets

MISSING LINK/PART DETECTOR EMPLOYING SCANNING ENGINE

BACKGROUND OF THE INVENTION

1. Field of the Invention

The invention pertains to the field of inspection of manufactured items. More particularly, the invention pertains to a method and apparatus for detection of missing, mislocated or defective chain links or other parts, using a scanning engine.

2. Description of Related Art

Missing link detection is a significant issue in regard to chain assembly of parallel-link type chains. As chain designs are forced toward smaller packages, chain design safety factors are decreasing. Where, at one time, a single missing link could be tolerated for most real-world applications, this is no longer the case with many current production chains. Today, a single missing chain link could easily result in a catastrophic field failure, and the resulting cost and customer relation issues that inevitably follow.

Most, but not all, production chain assembly machines have a missing link detector system installed. However, current production systems have significant shortcomings. Typically, such systems are expensive, difficult to set up, and very time consuming to maintain. More importantly, current systems have proven to be unreliable at times. As such, chains typically receive at least one and sometimes multiple visual inspections before shipment, to assure that no links are missing.

Fundamentally, the prior art missing link systems are quite simple—usually an electromechanical system relying on physical contact with the chain links, as shown in FIG. 1. As chain 1 runs by an inspection station, fingers 3 and 5 contact the backs of the links. If a link 2 is present, then finger 3 closes switch 4 and electrically indicates the presence of a link. If a link 7 is missing, the finger 5 falls into the open area between links and opens switch 6, signaling a missing link.

The sensors are usually located at the final assembly station just prior to pin insertion. When properly aligned and calibrated, the system serves its purpose well. Unfortunately, in a production environment the system is susceptible to many problems—the setup and alignment of the system is quite tedious, and the mechanical parts become clogged with dirt and metal chips, which causes false missing link indications. Most problematic, however, is the inevitable wear that occurs when sensing parts continuously contact the links as they move through the assembly machine. Despite the sensing parts having extremely hard (and expensive) carbide material tips, the hardened chain links eventually wear into the tips. When the wear becomes excessive, the system fails.

Such mechanical systems can, at most, detect links which are truly "missing"—that is, not present at all. They are less capable, or incapable, of detecting mislocated links or links of incorrect type.

One patent on inspection of chains using optical technology, assigned to BorgWarner Corporation, the assignee of the present application, is Ledvina and Mead, U.S. Pat. No. 4,509,323. This patent distinguishes between two types of links in a parallel link chain by reflecting a light off the backs of the links, and reading the reflected light in two sets of sensors, set at different angles. One type of link is made with a flat back, the other with a crowned back. The flat back link reflects light in one direction, toward one set of sensors, the crowned back in many directions, toward both both sets of sensors, and thus an "out of place" link can be detected by which sensors are illuminated. Since each group of parallel links is supposed to be all of one type, any mixture of types would mean an "out of place" link, and stop the machine. The method does not use bar-code reader technology, and is not applicable to chains with only one kind of link.

Bar Code Reader Technology

Obviously there is a great need in the art for a truly reliable missing link detection system. The present invention provides a solution to this problem, utilizing standard bar code reader equipment to detect missing chain links.

Bar code technology is currently very widely used for its ability to read black and white labels. Every supermarket and many, if not most, stores use bar codes on products to eliminate manual entry of prices and track inventory. Package delivery services such as UPS and Federal Express use optical bar code readers each including a scanning engine to track packages, and so on. Bar code reader scanning engines are now used for component identification in many industries.

There are two common types of bar code readers. The first is based on mechanical scanning laser beam technology. FIG. 2 shows a schematic view of a laser bar code reader and the operation of this type of reader. A laser 14 is directed at a continuously rotating, multi-sided mirror 16. As the mirror rotates, the geometry of the system projects a continuously scanning laser line onto the target (i.e., the bar code). The reflected light is then detected and interpreted by a reflected light detector system 18. Because laser light is polarized and very intense, the system has great depth-of-field and is insensitive to target variations. Unfortunately, mechanical scanning laser based bar code readers are quite expensive, compared to the alternatives. Also, because they have moving parts, laser based bar code readers are quite fragile and must be isolated from vibration to function properly. More particularly, even under controlled conditions, laser bar code readers typically have a finite useful life.

The second common type of bar code reader uses a different technology that is more suited to harsh environments. These bar code readers are based on Charge Coupled Device (CCD) technology and have no moving parts. A schematic view and the operation of this type of bar code reader is shown in FIG. 3. In the CCD bar code reader, an array of light sensitive diodes 22 is used to view a fixed scan line outside the reader. A lens system 24 is used to focus the incoming light onto the diode array. In this system, typically the light source used to illuminate the target area is a Light Emitting Diode (LED) array 20. The light sensitive diode array 22 is illuminated with an image of the scan line, which is approximately 0.040" wide. The output of the diode array is continuously scanned, digitized, and interpreted. This method is similar to that used in the common digital camera, except that only a single line is viewed by the bar code reader.

SUMMARY OF THE INVENTION

The invention is a method of inspecting a workpiece such as a parallel-link chain, detecting missing links in the chain, or detecting a missing part in a set of parts, using a bar code reader. The workpiece being inspected is scanned by the bar code reader as it passes by an inspection point, and the output of the barcode reader representing the workpiece is digitized and compared to a predetermined pattern. Missing links or parts are detected by missing pulses in the returned pattern. The invention also presents a novel apparatus for inspection of chains for missing links using bar code readers.

DETAILED DESCRIPTION OF THE INVENTION

Figure 1:
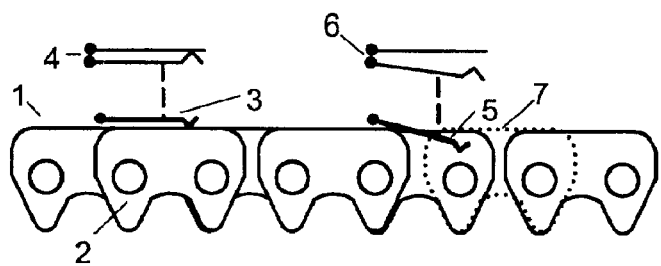
FIG. 1 shows a schematic view of a production electromechanical missing link detector of the prior art.
Figure 2:
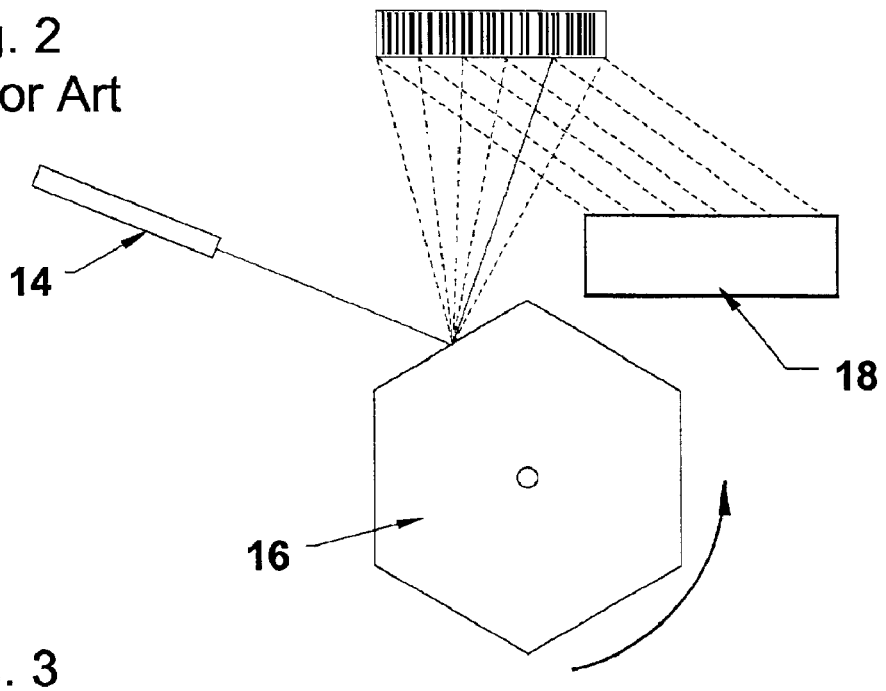
FIG. 2 shows a schematic view of a laser bar code reader of the prior art.
Figure 3:
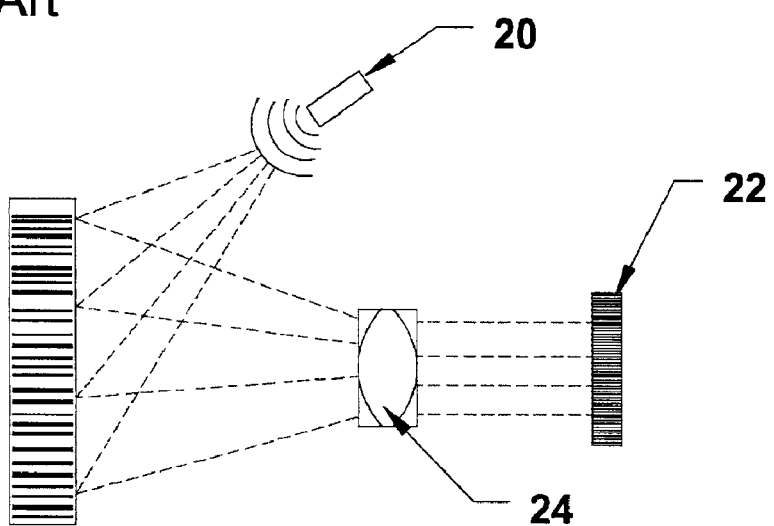
FIG. 3 shows a schematic view of a CCD bar code reader of the prior art.

The present invention provides a method and apparatus for detecting missing chain links and other parts. The system utilizes bar code reader technology to detect missing links in both assembled and in-process chains. The basic technology is described as well as alternative application methodologies.

It is commonly known that scanning systems typically have different subsystems, such as the scanning engine, the optical sensors and the decoder. Some of the subsystems, such as the decoder may be incorporated into a microcontroller. The interfaces between these different subsystems must support the required processing power and allow one to improve one part of a scanning system without redesigning other systems. A bar code reader is the equivalent of a scanning engine or at least includes the scanning engine. The present invention teaches the use of just a subsystem of a scanning system, i.e. a scanning engine, for detection of missing, misallocated or defective chain links, or other parts. Because the line images derived from the chain links or other parts do not have identical characteristics of a conventional bar code which has to meet certain industry standards, such as ISO/ANSI standards, the line images derived from the chain link or other parts is not identical as that of the bar codes. Furthermore, the interfaces between these different subsystems must support the required processing power and allow one to improve one part of a scanning system. In other words, the present invention uses merely part of a Scanning system, not for scanning a bar code, but for detection of missing, misallocated, or defective chain links or other parts.

The advantages of bar code reader approach over the prior art systems are many. Bar code reader technology is well established and the fundamental method is well known. Further, bar code readers themselves are relatively inexpensive, especially when compared to the complex hardware required for the current electromechanical systems. Because the method of the invention is non-contacting, component wear is not an issue. Finally, the alignment of bar code readers is not terribly critical. They are capable of reading standard bar code labels from a variety of angles and distances, thus, installation and setup are much easier than the current system.

It should be noted that while either CCD or laser-based bar code readers can be used within the teachings of the invention, the descriptions herein will concentrate on the CCD bar code reader technology, which is considered to be well suited to missing chain link detection for several reasons. First, there are no moving parts in a CCD bar code reader. Consequently, they are less affected by vibration and have a significantly higher useful life. Second, the lens system of the CCD bar code reader produces a defined depth-of-field, which allows the bar code reader to focus on the chain links, and not the background surfaces behind the links. Finally, CCD bar code readers are relatively inexpensive, compared to laser based readers. Thus, we determined that CCD bar code readers are the best available technology to use for missing link detection. Nevertheless, the method of the invention is also applicable to laser-type readers, and such readers might be preferred in some circumstances.

Figure 4:
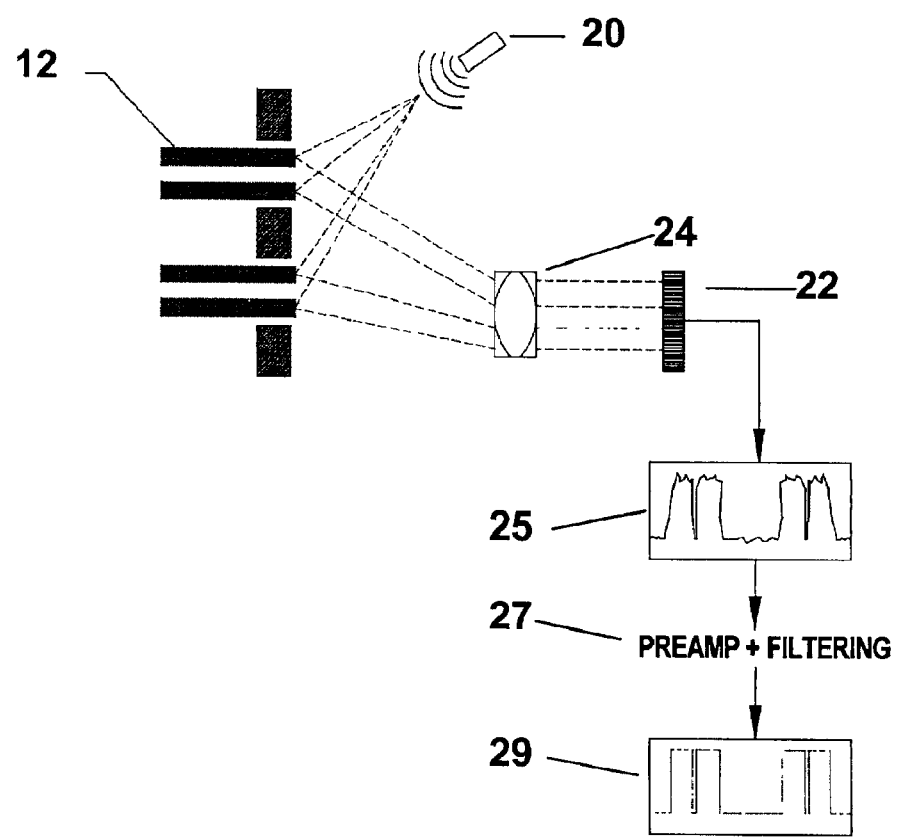
FIG. 4 shows a schematic view of a reflection method CCD bar code missing link detector system, according to an embodiment of the present invention.

FIG. 4 shows a schematic view of a reflection method CCD bar code missing link detector system. This reflection method is directly adaptable to the current electromechanical installation location.

While it would be possible within the teachings of the invention to use a digital output of a bar code reader, in this example the CCD bar code reader is modified to provide analog output of the scanned diode array signal prior to digitizing, according to methods that are well known in the art.

The chain links 12 are moved past the detector for inspection. In the context of this invention, it will be understood by one skilled in the art that this movement may be continuous, or start-stop. Because bar code readers scan quickly and repeatedly (over 100 times per second, typically) the chain does not need to come to a halt for the detector to scan each link several times, however in some applications the assembly machine might by its nature operate in a start-stop mode, for example to permit insertion of pins or the like, and it might be desirable to scan while the chain is halted in a desired position. As another method of relative movement, the detector might move past the links and the chain remain stationary.

An LED light source 20 is used to illuminate the chain links 12. The light reflected from the chain links 12 is focused by the lens 24 of the bar code reader onto the CCD diode array 22. The bar code reader is positioned such that the chain links 12 to be inspected are within the depth-of-field for the lens system 24, and the output 25 is measured. The measured signal 25 is then "cleaned up" by being sent through a low pass filter and adjustable trigger level pre-amp 27, resulting in a digital pulse signal 29, in which the pulses represent the presence of a link, and no pulse represents no link.

Figure 5A:
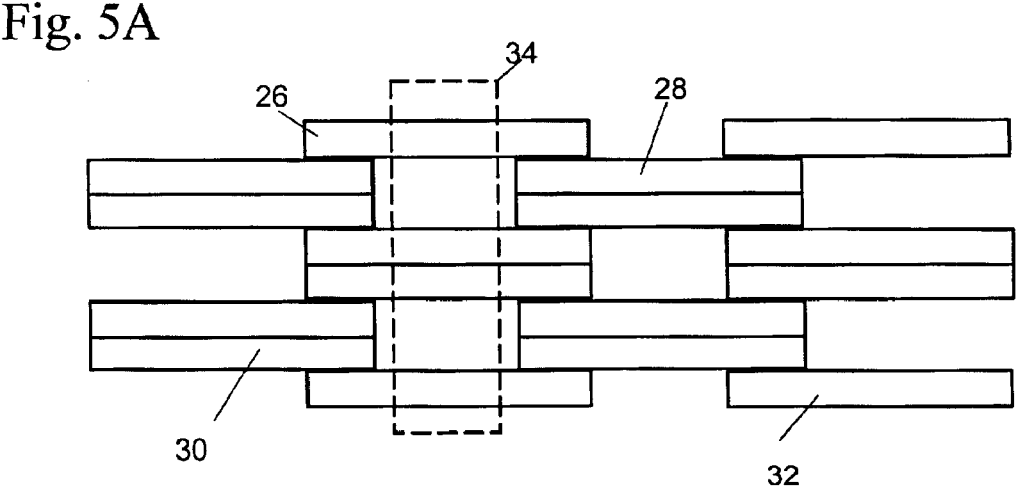
FIG. 5A shows a parallel link chain, which was scanned using CCD bar code missing link detector system, according to an embodiment of the invention.
Figure 5B:
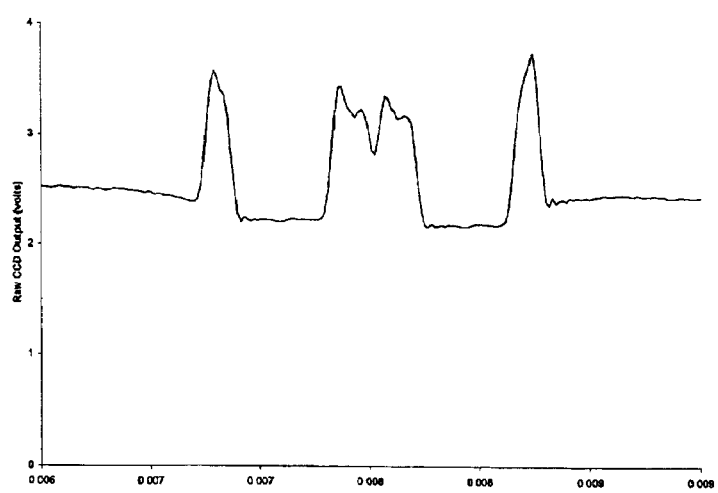
FIG. 5B shows a graph depicting raw CCD output from a scan of the chain depicted in FIG. 5A, according to an embodiment of the present invention.
Figure 5C:
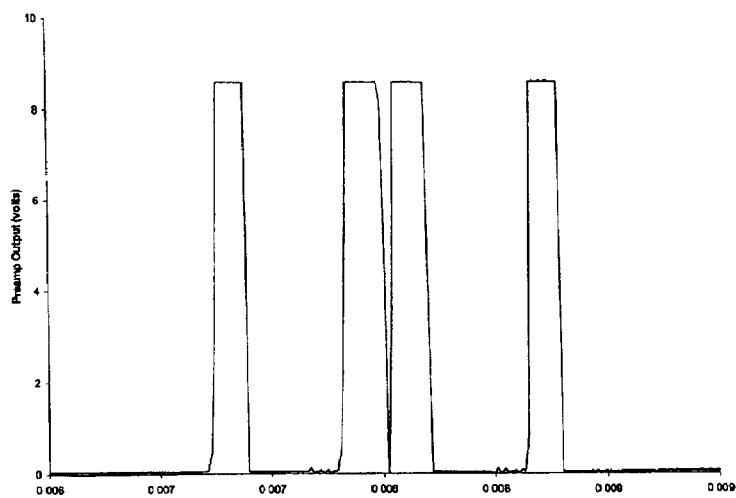
FIG. 5C shows a graph depicting pre-amp output from a scan of the chain depicted in FIG. 5A, according to an embodiment of the present invention.

FIG. 5A shows a parallel link chain, which was scanned using CCD bar code missing link detector system of the present invention. FIGS. 5B–5C show the output of the bar code missing link detector system. In this embodiment of the invention, the reader is positioned to scan the guide row 32 of a parallel link chain. The raw output signal (FIG. 5B) is very impressive. Although the measured signal is not perfect, the bar code reader clearly is capable of measuring the basic chain link profile. The output at the link locations is well above the signal noise and is even capable of identifying the slight gap between the side-by-side or double laced links. The filter/pre-amp circuit provides a nearly perfect profile of the non-guide chain row 28.

It will be understood that in the context of this invention, the term "missing" is intended to include defective, mislocated, or incorrect links or parts, as well as those which are entirely gone. For example, sometimes links might be inserted upside-down, or an unfinished link with an ragged or rough back might have slipped into the mix, or links of a different kind or size, or links might have been inserted off-center (sometimes assembly machines will punch pins through links, rather than through the holes in the ends of the links). It will be clear to one skilled in the art within the teachings of the invention, that the signal from one of these situations (covered by the general term "missing link" herein) will be detectably different from the signal from an assembly of correct links.

Figure 6:
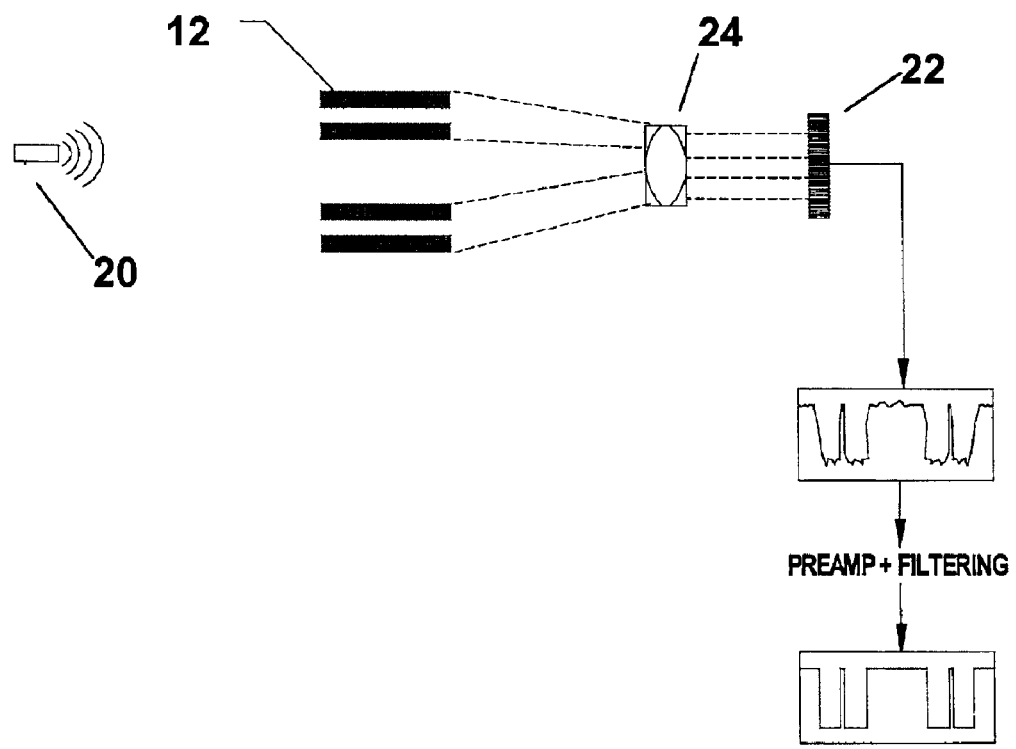
FIG. 6 shows a schematic view of a back-lighted method CCD bar code missing link detector system, according to an embodiment of the present invention.

FIG. 6 shows a schematic view of an alternative embodiment of the invention, comprising a back-lighted method CCD bar code missing link detector system. In this embodiment, the light source is placed behind the chain to eliminate the chain link reflectivity as a system variable. The LED light source passes through the gaps between the chain links. The chain links themselves actually block the light from passing. In addition to eliminating the chain link reflectivity, the direct lighting of the diode array produces significant improvements in signal-to-noise ratios. Because currently there is no practical way to back-light the link stack on an assembly machine, this alternative method is not directly applicable for replacing the current production systems. However, the back-lighting method is practical for post-assembly inspection of chains.

The present invention has been used successfully to evaluate many chain variables, including various link quality, chain styles, differing chain clearance, background surfaces, and oil contamination. In each and every test, the output signal provided signal-to-noise ratios that were deemed adequate for missing link detection.

Missing Parts Application

Figure 10A:
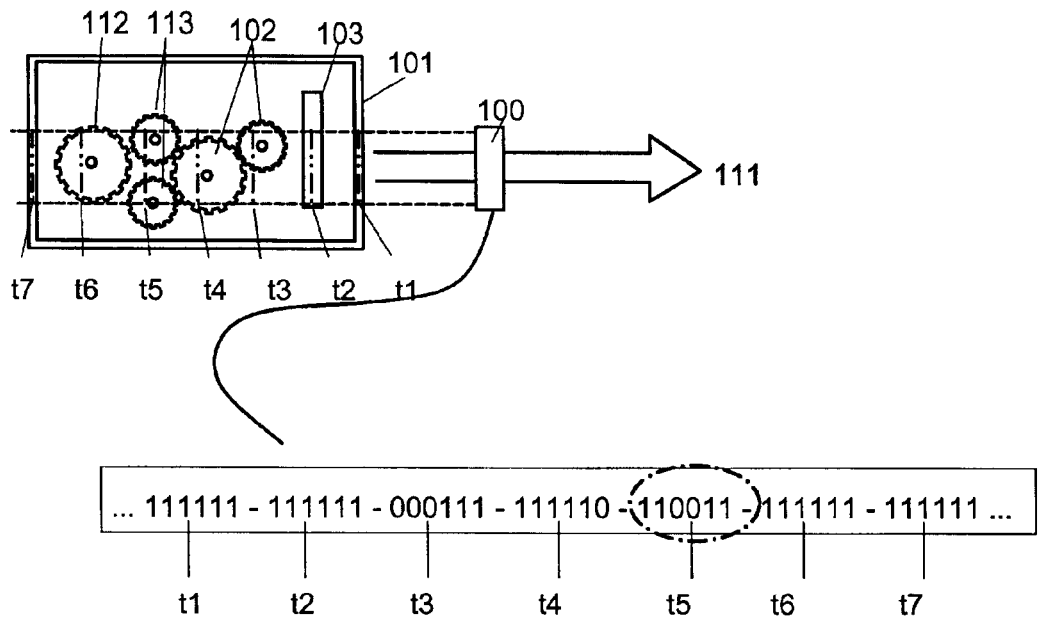
FIG. 10a–10b shows the method of the invention used for missing component detection.
Figure 10B:
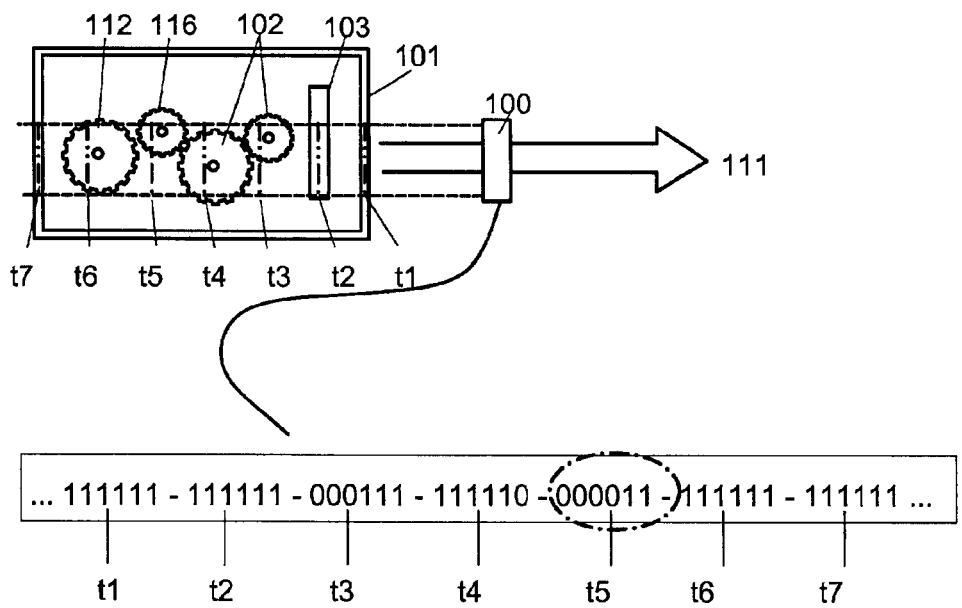

FIGS. 10a and 10b show the method of invention, used to inspect a collection of parts, rather than the chain described above. As one application, in the automotive industry it has become commonplace for suppliers to ship kits of parts to manufacturers, so that when an engine is being assembled an entire timing drive—chain, sprockets, guides, idlers, etc.—is provided in one box for one-step assembly onto the engine, rather than as independent parts which would need to be selected from bins and added one at a time. If the kit is missing any of its component parts, the assembly is impossible. Hence, it is desirable to check the collection of parts for completeness before shipment, rather than run into problems at the auto plant.

In this example, suppose a supplier sells a collection of parts in a kit. The parts in the example are a large gear 112, two smaller gears 113, and a large and medium gear set 102, with a shaft 103, all packaged in a box 101. The box 101 moves along a path 111, say, an assembly line in which the parts are put in the box. It is desirable that all of the kits are shipped with a complete set of gears and shaft.

In accordance with the teachings of the invention, a bar code reader 100 is mounted above the path 111, so that the box 101 will move underneath the reader 100, and the reader 100 can see a strip across the box which will intersect all of the parts in the kit. The dashed line in the figures shows the strip read by the reader 100—it will be understood that the size and position of the strip will vary within the teachings of the invention.

In FIG. 10a, a complete kit is being inspected. As it passes under the barcode reader 100, the reader will detect the leading edge of the box 101 at time t1, the shaft 103 at t2, the medium gear at t3, the second large gear at t4, the pair of gears 113 at t5, the first large gear 112 at t6, and finally the trailing edge of the box 101 at t7. The output of the bar code reader is represented by a string of binary numbers, each representing a scan across the strip between the dotted lines. The circled numbers at t5 represent the scan of the two small gears 113—the number 110011 representing a detection of the two gears with a space between. It will be recognized by one skilled in the art that these numbers are merely for the purpose of example, and the number of bits and how the signal is derived can vary, as described in more detail below.

In FIG. 10b, one of the two small gears is missing, leaving only the upper small gear 116. The box is scanned as was the box in FIG. 10a, but this time the circled number at t5 is 000011, not 110011, which can be detected and cause the system of the invention to warn an operator that one of the small gears is missing from the kit, and it should be pulled from the line.

Figure 12:
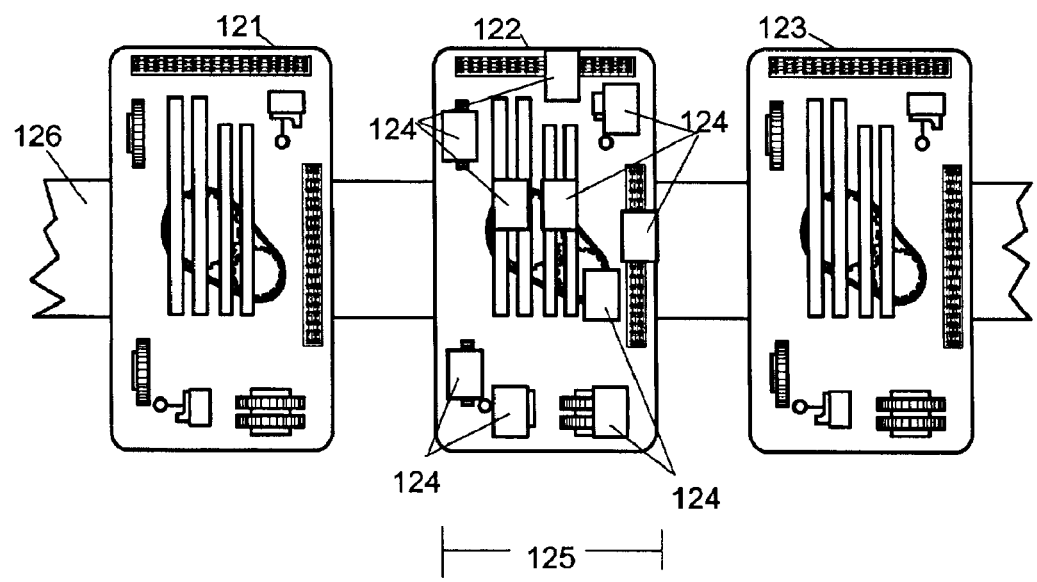
FIG. 12 shows an alternative arrangement for using the method of the invention for missing component detection.

FIG. 12 shows a different way of applying the invention to missing part detection. In this figure, kits of parts 121, 122 and 123 are progressing along conveyor 126. Each kit has a number of parts, for example sprockets, gears, chains, belts and tensioners for an automotive engine. As might be expected, with the auto industry's "just in time" parts supply system, if a kit were to arrive on an automobile assembly line with a part missing or incorrect, it would be very expensive for the manufacturer, and hence for the supplier, to correct the problem as the engine is assembled. Thus it is important to inspect the kits before they leave the supplier.

With this embodiment of the method of the invention, instead of scanning the kit as it passes by, as is done in the embodiment of FIGS. 10a–10b, the line is stopped with kit 122 at inspection station 125, where there are a number of barcode readers 124, each one located so as to be able to scan a location with one or more parts of the kit. With the kit in position, each barcode reader 124 scans the area under the reader. This results in a characteristic scan pattern, which is compared to a reference pattern for the specific reader. If the scan differs from the reference pattern, for example if a part is incorrect, misplaced or missing, the error can be quickly noticed and corrected.

Signal Interpretation

Off-the-shelf bar code readers have an integrated signal interpretation system that is very complex. In fact, this aspect of bar code technology is the focus of most current development efforts in that industry. In regard to the present invention, a specialized analysis network for identification of missing chain links optionally is included within the bar code reader hardware. Such a system is self-contained and communicates directly with the assembly machine PLC. Optionally, the signal interpretation system is independent of the bar code reader itself. There are several advantages of this approach. First, it allows users of the invention to purchase relatively inexpensive (i.e., generic) bar code readers from a variety of suppliers. Second, an in-house developed system can be more easily altered and adapted to particular production variations and future developments.

Figure 7:
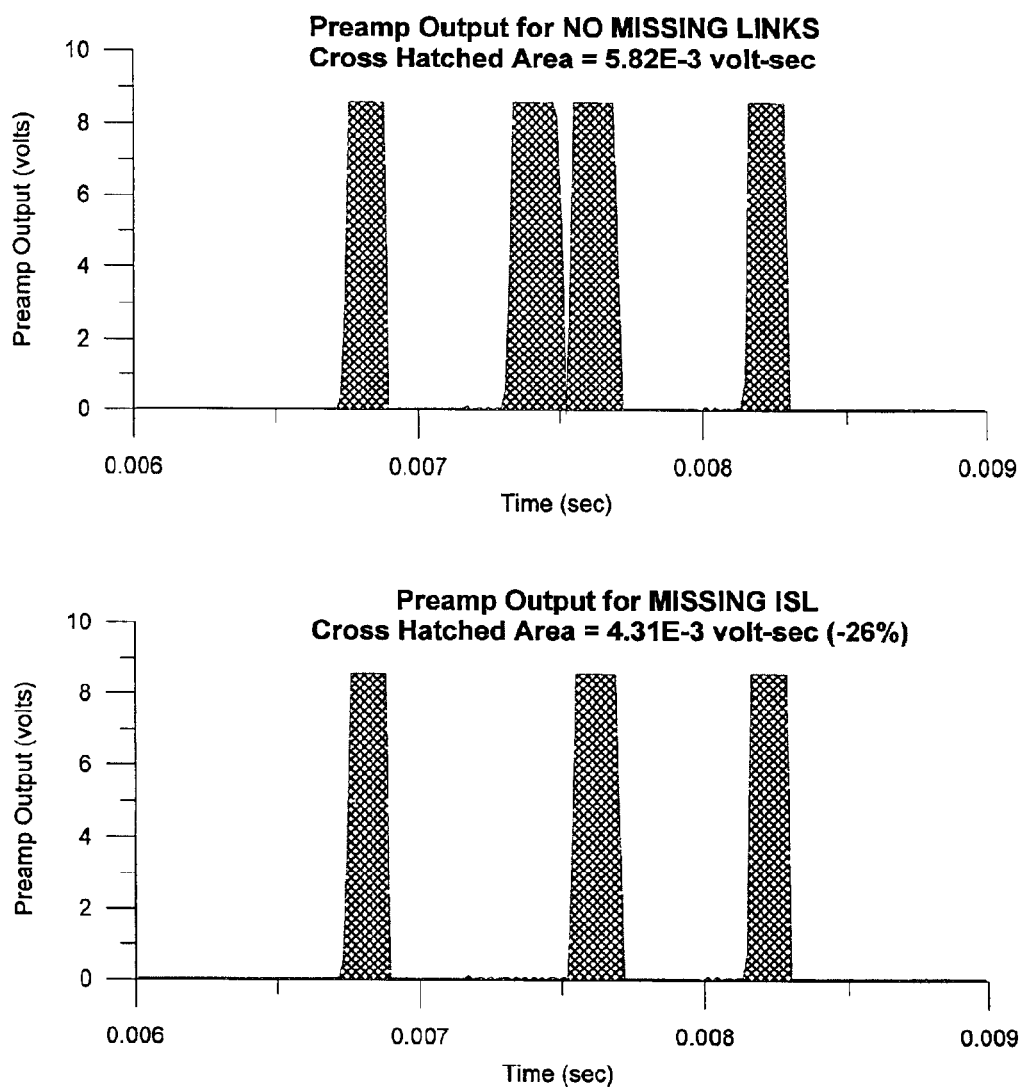
FIG. 7 shows a graph depicting the results of an integration method for missing link detection, according to an embodiment of the present invention, showing 26% decrease in area under measured signal curve for a missing inside link (parallel link).

Several approaches to the interpretation of the bar code reader signals have been employed. The first analysis system utilizes mathematical integration of the output signal. This method, the output of which is shown in FIG. 7, calculates the area under the measured output curve. The area under the measured signal curve is relatively constant for a chain with no missing links. However, when a link is missing, the integrated value is lower by a significant percentage of the expected value.

For example, as shown in FIG. 7, a single missing link in a parallel link chain caused a 26% decrease in the integrated value. However, this approach becomes more difficult as link count per row increases. For example, some chains may have 10 or more links per row. Using the method shown in FIG. 7, a missing link in such a chain would produce no more than about a 10% decrease in integrated value, and such variations are too small to consistently identify missing links with reliable accuracy. Thus, an alternative approach is required for the higher link per row chain designs.

Alternatively, an analysis system based on link counting is employed. This system simply counts the number of level transitions (either low to high or high to low) in the diode array output and compares the counted links to a preset value. If the link count is lower than the preset value, then a missing link is indicated. This system also includes several adjustment features that make the system much more adaptable to different chain types and installations.

The most useful feature of the present invention is an adjustable analysis window. Because the bar code readers used in the invention have a fixed scan width of approximately 1.5", in most cases much of the measured signal is not associated with the chain itself.

Figure 8:
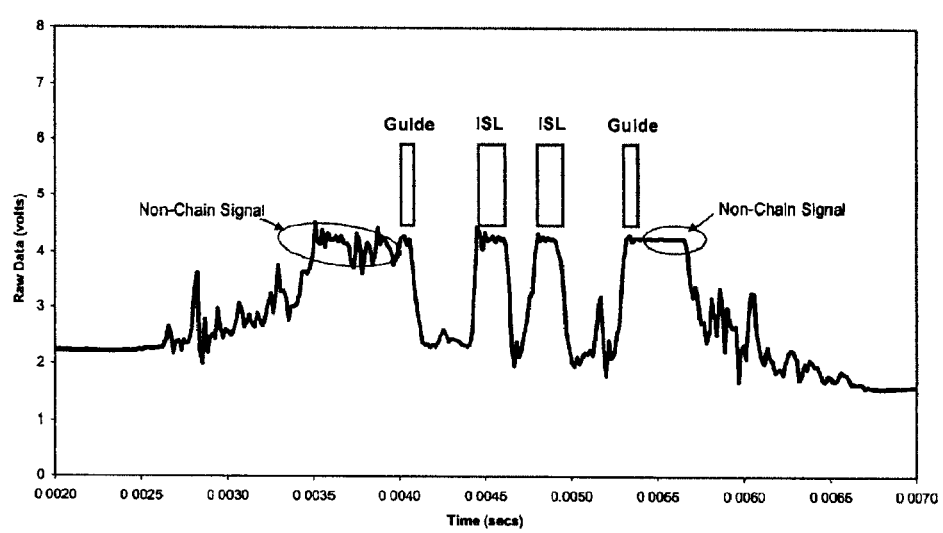
FIG. 8 shows a graph of a bar code reader output, according to an embodiment of the present invention, showing non-chain related signals, which can eliminated by the present invention ("ISL" is inside link).

FIG. 8 shows a measured output signal from a system measuring the guide row of a 4×5 block-laced chain. The signal from the inside links is quite obvious. But the guide links are difficult to discern because of reflected light from non-chain related hardware. In this case, light is reflecting off of the edges of the view window aperture.

One embodiment of the present invention has a variable analysis window that directs the analysis circuit to only count links within the analysis window, so that the non-chain signals are ignored by the analysis system. Another feature of the invention is an adjustment that allows for variable link width adjustment. This feature prevents intermittent noise, such as, for example, that caused by link breakout roughness, from generating extra link counts. In addition, the invention can be used to count links in either the reflection or back-lighted configurations.

Figure 11:
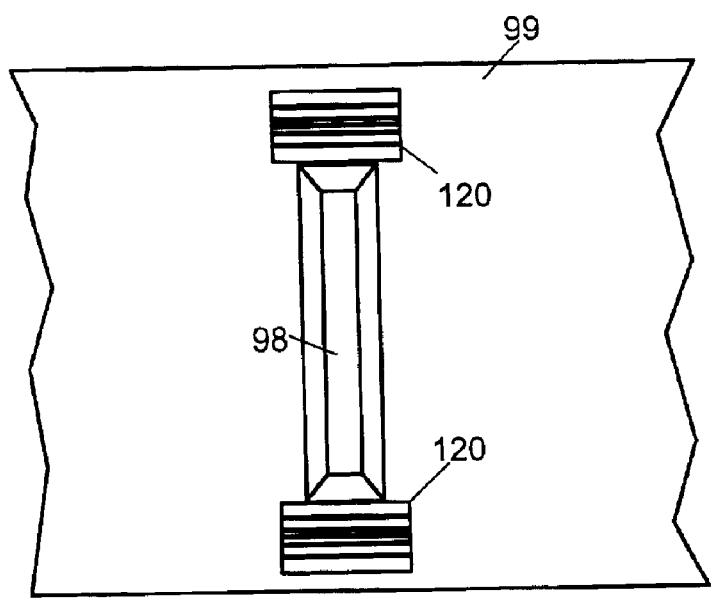
FIG. 11 shows a view aperture in a chain guide, with additional markings outside the scan area.

As shown in FIG. 11, in order to better define the limits of the desired signal, it is possible within the teachings of the invention to provide markings (120) on the inside (back) of the chain guide (99) on one or both sides of the view window aperture (98). These markings could be in the form of a reflective area or label with sharply defined bars, as shown in the figure, or could be etched or marked into the back of the chain guide itself. The markings would preferably be in a pattern which would be easy to detect and differentiate from noise.

This would provide a constant, relatively noise-free, predetermined signal at each end of the scan, which could be used to calibrate the analysis window to select the desired part of the bar code reader output.

Apparatus for Practicing the Invention

The first prototype bar code missing link detector system was designed to physically replace the present electromechanical system on an assembly machine. The system utilizes two off-the-shelf CCD bar code readers, one each to scan the guide row and non-guide row of the chain. Vertical slots slightly wider than the chain are cut in the front face plate, through which the bar code reader scans the link stack. The inside of the hardware is preferably painted black to minimize background reflections. Even though there is no analysis window adjustment in this first embodiment, after some adjustment, the signal quality obtained is excellent (very similar to that shown in FIG. 5).

This first prototype utilizes the integration method discussed above to detect missing links. The cycle rate for this bar code reader is approximately 100 scans/second. The assembly machine timing allows for a 10 scan average of the measured signal. The system functions very well. The reader output stays consistent over time.

Figure 9:
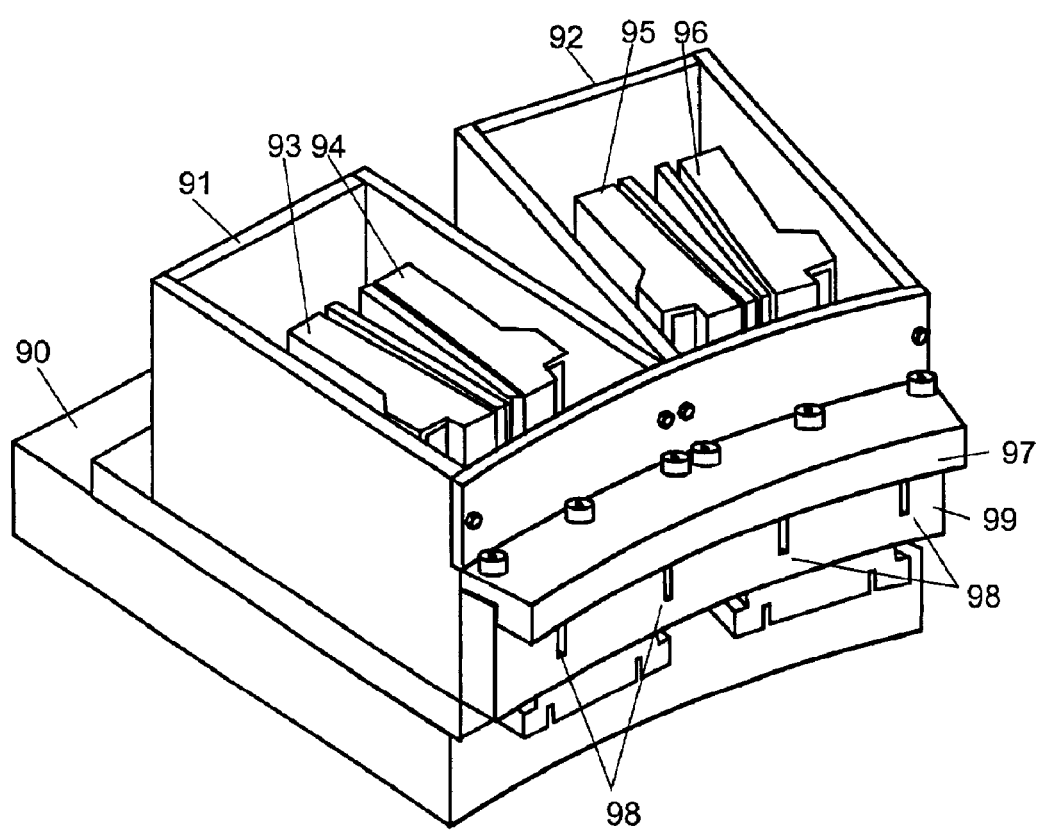
FIG. 9 shows a perspective view of a chain inspection apparatus of the invention, using multiple bar code readers.

FIG. 9 shows an embodiment of the apparatus of the invention, designed to physically replace the optomechanical system on an assembly machine. Mounted on a base (90) to the machine, this system includes 4 bar code readers (93)(94)(95)(96), with a high intensity LED light source (not visible in this view). The readers are enclosed in boxes (91)(92) in pairs, and the bar code readers view the chain through view window apertures or slots (98) in the curved chain guide (99), which matches the curve of the chain path in the assembly machine. A shelf (97) protects the top of the chain run, guiding the chain and minimizing stray overhead light. Preliminary testing indicates that the higher intensity light source providing superior output signals, when compared to the first prototype. The link counting methodology of this embodiment circuit appears to be functioning well.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of detecting missing parts in a workpiece comprising a plurality of parts, comprising the steps of:
    a) moving the workpiece, in which the workpiece is a parallel-link chain, and the missing part is a link in the chain relative to a scanning engine;
    b) detecting a line image across the workpiece with scanning engine, producing a signal output representative of the line image;
    c) deriving a processed signal from the signal output of the scanning engine;
    d) comparing the processed signal to a reference signal representing a workpiece without missing parts; and
    e) indicating if the processed signal does not match the reference.

2. The method of claim 1, in which the workpiece is a plurality of parts in a container.

3. The method of claim 1, in which the deriving step (c) comprises the steps of amplifying an output from the scanning engine and filtering the amplified output.

4. The method of claim 1, in which the deriving step (c) further comprises the step of extracting a portion of the signal output representing a part of the line image, forming a data analysis window, and the comparison step (d) is performed only on the portion of the image in the data analysis window.

5. The method of claim 4, further comprising the step of providing scannable indicia on at least one side of the workpiece, in position to be imaged by the scanning engine along with the line image of the workpiece, and the step of extracting uses the imaged scannable indicia as a marker to determine the data analysis window.

6. The method of claim 5, in which the scannable indicia are bar codes.

7. The method of claim 5, in which scannable indicia are provided on each end of the workpiece, and the data analysis window is taken between the detected scannable indicia.

8. The method of claim 1, in which the step of deriving a processed signal comprises producing an integral signal level representing an average level of the signal output of the scanning engine, and the step of comparing comprises comparing the integral signal level to a reference signal level.

9. The method of claim 1, in which the step of deriving a processed signal comprises converting the signal output of the scanning engine into a number.

10. The method of claim 9, in which the reference is a number, and the step of comparing comprises comparing the two numbers.

11. The method of claim 9, in which the number is derived by counting level transitions in the output of the scanning engine across the linear image.

12. The method of claim 9, in which the number is a binary number in which each bit represents a detection or non-detection of a part.

13. The method of claim 1, further comprising the step, before the detecting step (b) of illuminating the workpiece.

14. The method of claim 13, in which the workpiece is illuminated so that light reflects off the workpiece, and the linear image is produced from a reflected light image of the workpiece.

15. The method of claim 13, in which the workpiece is illuminated from behind, such that the workpiece is between the illumination and the scanning engine, and the linear image is produced by the parts blocking light from the illumination.

16. The method of claim 1, in which the workpiece is moved continuously relative to the scanning engine.

17. The method of claim 1, in which the workpiece is moved in a start-stop motion relative to the reader, and the line image is detected while the workpiece is stationary.

18. A missing part detection system for detection of missing parts in a workpiece having a plurality of parts, comprising:
   a) a light source for illuminating the workpiece, in which the workpiece is a parallel-link chain, the missing parts are links in the chain, and there are two scanning engines, one each to scan guide row and non-guide row links of a chain; and
   b) a light sensitive array for detecting a line image of the workpiece, produced by said light source, having a signal output representative of the detected line image; and
   c) a signal processing circuit having an input coupled to the signal output of the light sensitive array, and an output, such that the signal output of the light sensitive array is compared to a reference signal representative of a complete workpiece without missing parts, and the output of the signal processing circuit producing a signal when the comparison indicates a part is missing.

19. The missing part detector system of claim 18, further comprising a chain guide having vertical slots slightly wider than the chain, through which said scanning engines scan said chain links.

20. The missing part detector system of claim 19, wherein an inside of chain guide is painted black to minimize background reflections.

21. The missing part detector system of claim 18, wherein the workpiece is positioned within a depth-of-field for said light-sensitive array.

22. The missing part detector system of claim 18, wherein the signal processing circuit comprises a high pass filter and adjustable trigger level pre-amp.

23. The missing part detector system of claim 18, wherein the signal processing circuit utilizes mathematical integration of an output signal from said light sensitive array and calculates an area under a measured output curve, and the reference is a voltage.

24. The missing part detector system of claim 18, wherein the signal processing circuit counts a number of level transitions in the signal output of the light sensitive array, and the reference is a preset value.

25. The missing part detector system of claim 24, wherein the signal processing circuit includes a variable analysis window that only counts changes within said analysis window, such that signals outside the window are ignored by said analysis system.

26. The missing part detector system of claim 18, in which the light source is located so that the workpiece is illuminated from a same side as the light sensitive array, such that the line image is detected by reflection of light from the workpiece.

27. The missing part detector system of claim 18, in which the light source is located behind the workpiece, such that the light from the light source silhouettes the workpiece, and the line image is detected by light blocked by parts or passed where there are no parts.

28. A method of detecting missing parts in a workpiece comprising a plurality of parts, comprising the steps of
   a) moving the workpiece relative to a scanning engine;
   b) detecting a line image across the workpiece with scanning engine, producing a signal output representative of the line image;
   c) deriving a processed signal from the signal output of the scanning engine;
   d) comparing the processed signal to a reference signal representing a workpiece without missing parts; and
   e) indicating if the processed signal does not match the reference;
   wherein the step of deriving a processed signal comprises converting the signal output of the scanning engine into a number;
   wherein the reference is a number, and the step of comparing comprises comparing the two numbers; and
   wherein the number is a binary number in which each bit represents a detection or non-detection of a part.

29. A method of detecting missing parts in a workpiece comprising a plurality of parts, comprising the steps of:
   a) moving the workpiece relative to a scanning engine;

b) detecting a line image across the workpiece with scanning engine, producing a signal output representative of the line image;

c) deriving a processed signal from the signal output of the scanning engine;

d) comparing the processed signal to a reference signal representing a workpiece without missing parts; and e) indicating if the processed signal does not match the reference;

in which the workpiece is moved in a start-stop motion relative to the reader, and the line image is detected while the workpiece is stationary.

30. A missing part detection system for detection of missing parts in a workpiece having a plurality of parts, comprising:

a) a light source for illuminating the workpiece;

b) a light sensitive array for detecting a line image of the workpiece, produced by said light source, having a signal output representative of the detected line image; and c) a signal processing circuit having an input coupled to the signal output of the light sensitive array, and an output, such that the signal output of the light sensitive array is compared to a reference signal representative of a complete workpiece without missing parts, and the output of the signal processing circuit producing a signal when the comparison indicates a part is missing;

wherein signal processing circuit utilizes mathematical integration of an output signal from said light sensitive array and calculates an area under a measured output curve, and the reference is a voltage.

31. A missing part detection system for detection of missing parts in a workpiece having a plurality of parts, comprising:

a) a light source for illuminating the workpiece;

b) a light sensitive array for detecting a line image of the workpiece, produced by said light source, having a signal output representative of the detected line image; and c) a signal processing circuit having an input coupled to the signal output of the light sensitive array, and an output, such that the signal output of the light sensitive array is compared to a reference signal representative of a complete workpiece without missing parts, and the output of the signal processing circuit producing a signal when the comparison indicates a part is missing;

wherein the signal processing circuit counts a number of level transitions in the signal output of the light sensitive array, and the reference is a preset value; and wherein the signal processing circuit includes a variable analysis window that only counts changes within said analysis window, such that signals outside the window are ignored by said analysis system.

32. A missing part detection system for detection of missing parts in a workpiece having a plurality of parts, comprising:

a) a light source for illuminating the workpiece;

b) a light sensitive array for detecting a line image of the workpiece, produced by said light source, having a signal output representative of the detected line image; and c) a signal processing circuit having an input coupled to the signal output of the light sensitive array, and an output, such that the signal output of the light sensitive array is compared to a reference signal representative of a complete workpiece without missing parts, and the output of the signal processing circuit producing a signal when the comparison indicates a part is missing;

in which the light source is located behind the workpiece, such that the light from the light source silhouettes the workpiece, and the line image is detected by light blocked by parts or passed where there are no parts.

* * * * *